United States Patent
Li et al.

(10) Patent No.: US 9,036,095 B2
(45) Date of Patent: May 19, 2015

(54) PANEL STRUCTURE

(71) Applicant: Chunghwa Picture Tubes, Ltd., Bade, Taoyuan (TW)

(72) Inventors: Yu-Chen Li, Zhongli (TW); Ching-Huei Ku, New Taipei (TW)

(73) Assignee: CHUNGHWA PICTURE TUBES, LTD., Taoyuan (TW)

( * ) Notice: Subject to any disclaimer, the term of this patent is extended or adjusted under 35 U.S.C. 154(b) by 337 days.

(21) Appl. No.: 13/654,633

(22) Filed: Oct. 18, 2012

(65) Prior Publication Data

US 2013/0314624 A1   Nov. 28, 2013

(30) Foreign Application Priority Data

May 24, 2012  (TW) .............................. 101118542 A

(51) Int. Cl.

| G02F 1/1335 | (2006.01) |
| G06F 3/044 | (2006.01) |
| H04N 13/04 | (2006.01) |
| G02F 1/1333 | (2006.01) |
| G02F 1/1347 | (2006.01) |

(52) U.S. Cl.

CPC ............ G06F 3/044 (2013.01); *G02F 1/13338* (2013.01); *G02F 1/13471* (2013.01); *G06F 2203/04103* (2013.01); H04N 13/0409 (2013.01); H04N 13/0497 (2013.01); *H04N 2213/001* (2013.01)

(58) Field of Classification Search

CPC .................................................. G02F 1/13338
USPC .......................................................... 349/12
See application file for complete search history.

(56) References Cited

U.S. PATENT DOCUMENTS

| 7,609,227 | B2 | 10/2009 | Tanaka |  |
| 2010/0149444 | A1* | 6/2010 | Hikmet et al. | ................... 349/15 |
| 2011/0267310 | A1* | 11/2011 | Tsukahara et al. | ............ 345/174 |

FOREIGN PATENT DOCUMENTS

| CN | 101876767 A | 11/2010 |
| CN | 102122097 A | 7/2011 |

(Continued)

OTHER PUBLICATIONS

English translation of abstract of TW M413123.

(Continued)

*Primary Examiner* — Michael Caley
*Assistant Examiner* — Edmond Lau
(74) *Attorney, Agent, or Firm* — CKC & Partners Co., Ltd.

(57) ABSTRACT

A panel structure includes a glass layer, a plurality of first indium tin oxide (ITO) strips, a plurality of third indium tin oxide strips, a liquid crystal layer, a plurality of second indium tin oxide strips, and a plurality of fourth indium tin oxide strips. The panel structure operates in a grating mode during a first predetermined time. The first indium tin oxide strips receive a voltage, and the second indium tin oxide strips and the fourth indium tin oxide strips are grounded when the panel structure operates in the grating mode. The panel structure operates in a touch-sensing mode during a second predetermined time. The first indium tin oxide strips sequentially receive a driving voltage, and the fourth indium tin oxide strips detect a touch event when the panel structure operates in the touch-sensing mode. The grating mode and the touch-sensing mode of the panel structure are implemented alternately.

9 Claims, 5 Drawing Sheets

(56) References Cited

FOREIGN PATENT DOCUMENTS

| | | |
|---|---|---|
| CN | 102262478 A | 11/2011 |
| JP | 2004272354 | 9/2004 |
| JP | 2012064027 A | 3/2012 |
| JP | 2012113520 A | 6/2012 |
| TW | 200900827 A | 1/2009 |
| TW | M413123 | 10/2011 |
| TW | 201217835 A1 | 5/2012 |

OTHER PUBLICATIONS

English translation of abstract of JP 2004272354.

* cited by examiner

PANEL STRUCTURE

RELATED APPLICATIONS

This application claims priority to Taiwan Application Serial Number 101118542, filed May 24, 2012, which is herein incorporated by reference.

BACKGROUND

1. Field of the Invention

The present invention relates generally to a panel structure and, more particularly, to a panel structure with a combination of barrier and touch sensing technology.

2. Description of Related Art

With technological improvements, display technologies have advanced from 2D (two-dimensional) mode to 3D (three-dimensional) mode. Many consumer electronics firms have invested a great deal into research and development of 3D display technology.

According to related reports, the European Union has invested 70 billion Euros into research and development of 3D display technology. Moreover, the governments of China and Korea have established measures to develop the 3D display industry. Furthermore, many firms in Japan are cooperating and establishing 3D alliances for developing 3D display technology. It is apparent that 3D display technology is quite important.

In addition, touch-sensing technology has been developed since the 1970s. Starting from when Apple Inc. introduced the iPhone® and iPod touch® in 2007, much attention has been given to touch-sensing technology.

Future trends for smart mobile devices are met such that 3D display technology and touch-sensing technology must be combined to promote the capability of such products. However, if touch-sensing technology and 3D display technology are combined, the touch-sensing structure, the barrier structure and the liquid crystal panel must be integrated. Such integration involves a two-step lamination process, and as a result, combining 3D display technology and touch-sensing technology is complicated, and also an additional number of glass substrates are needed, resulting in increased costs and thickness for the resulting device.

Nonetheless, there is still a need to improve existing apparatuses and techniques in the art. In particular, it is necessary to overcome the problems that increased costs and thickness of the resulting device resulted from complicated processes involved in combining 3D display technology and touch-sensing technology, and requiring many glass substrates when combining 3D display technology and touch-sensing technology.

SUMMARY

One aspect of the embodiment of the present invention is to provide a panel structure. The panel structure comprises a glass layer, a plurality of first indium tin oxide (ITO) strips, a plurality of third indium tin oxide strips, a liquid crystal layer, a plurality of second indium tin oxide strips, and a plurality of fourth indium tin oxide strips. With respect to the configuration of the panel structure, the first indium tin oxide strips and the third indium tin oxide strips are disposed on the glass layer, each of the first indium tin oxide strips and each of the third indium tin oxide strips interlaced in a first direction. The liquid crystal layer is disposed on the first indium tin oxide strips and the third indium tin oxide strips. The second indium tin oxide strips and the fourth indium tin oxide strips are disposed on the liquid crystal layer, each of the second indium tin oxide strips and each of the fourth indium tin oxide strips interlaced in a second direction. The first direction is substantially vertical to the second direction.

With respect to the operation of the panel structure, the panel structure operates in a first grating mode during a first predetermined time. The first indium tin oxide strips receive a voltage, and the second indium tin oxide strips and the fourth indium tin oxide strips are grounded when the panel structure operates in the first grating mode. The panel structure operates in a touch-sensing mode during a second predetermined time. The first indium tin oxide strips sequentially receive a driving voltage, and the fourth indium tin oxide strips are operable to detect a touch event when the panel structure operates in the touch-sensing mode. The grating mode and the touch-sensing mode of the panel structure are implemented alternately.

In one embodiment of the present invention, the third indium tin oxide strips are floating when the panel structure operates in the first grating mode, and the second indium tin oxide strips and the third indium tin oxide strips are floating when the panel structure operates in the touch-sensing mode.

In another embodiment of the present invention, an insulation material is disposed between each of the first indium tin oxide strips and the third indium tin oxide strips adjacent thereto, and the insulation material is also disposed between each of the second indium tin oxide strips and the fourth indium tin oxide strips adjacent thereto.

In yet another embodiment of the present invention, the panel structure further comprises a controller. The controller is operable to control the first indium tin oxide strips to receive the voltage and control the second indium tin oxide strips and the fourth indium tin oxide strips to be grounded when the panel structure operates in the first grating mode, and the controller is operable to control the first indium tin oxide strips to sequentially receive the driving voltage and control the fourth indium tin oxide strips to detect a touch event when the panel structure operates in the touch-sensing mode. The controller is operable to control the panel structure to operate in the first grating mode and the touch-sensing mode alternately.

In still another embodiment of the present invention, the panel structure operates in the first grating mode or in a second grating mode during the first predetermined time, and the third indium tin oxide strips receive the voltage, and the second indium tin oxide strips and the fourth indium tin oxide strips are grounded when the panel structure operates in the second grating mode.

In yet another embodiment of the present invention, the first indium tin oxide strips are floating when the panel structure operates in the second grating mode.

In still another embodiment of the present invention, the panel structure operates in the first grating mode or a third grating mode during the first predetermined time, and the second indium tin oxide strips receive the voltage, and the first indium tin oxide strips and the third indium tin oxide strips are grounded when the panel structure operates in the third grating mode.

In yet another embodiment of the present invention, the fourth indium tin oxide strips are floating when the panel structure operates in the third grating mode.

In still another embodiment of the present invention, the panel structure operates in the first grating mode or a fourth grating mode during the first predetermined time, and the fourth indium tin oxide strips receive the voltage, and the first indium tin oxide strips and the third indium tin oxide strips are grounded when the panel structure operates in the fourth grating mode.

In yet another embodiment of the present invention, the second indium tin oxide strips are floating when the panel structure operates in the fourth grating mode.

As a result, the embodiments of the present invention provide a panel structure which needs only one step to combine a touch-sensing structure, a barrier structure, and a liquid crystal panel so as to simplify the manufacturing process, and which reduces the use of glass substrates such that costs can be decreased and the thickness of a resulting device with touch-sensing technology and 3D display technology can be reduced.

In addition, the operating time of the touch-sensing mode of the panel structure is merely a few microseconds, and the turn-off time of the grating mode (3D) is extremely short. For a user, the panel structure appears to operate in the grating mode all the time, and the user experience will not be negatively affected such that the grating mode and the touch-sensing mode of the panel structure can be operated nearly at the same time; in other words, a user can see the 3D image and the panel structure can detect a touch event simultaneously.

Furthermore, regardless of whether the panel structure of the embodiment of the present invention is placed in a lateral orientation or a longitudinal orientation, with the use of the above-mentioned operation, the panel structure of the embodiment of the present invention can operate in a grating mode accurately and operate in both the grating mode and the touch-sensing mode without negatively affecting the user experience.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1A:
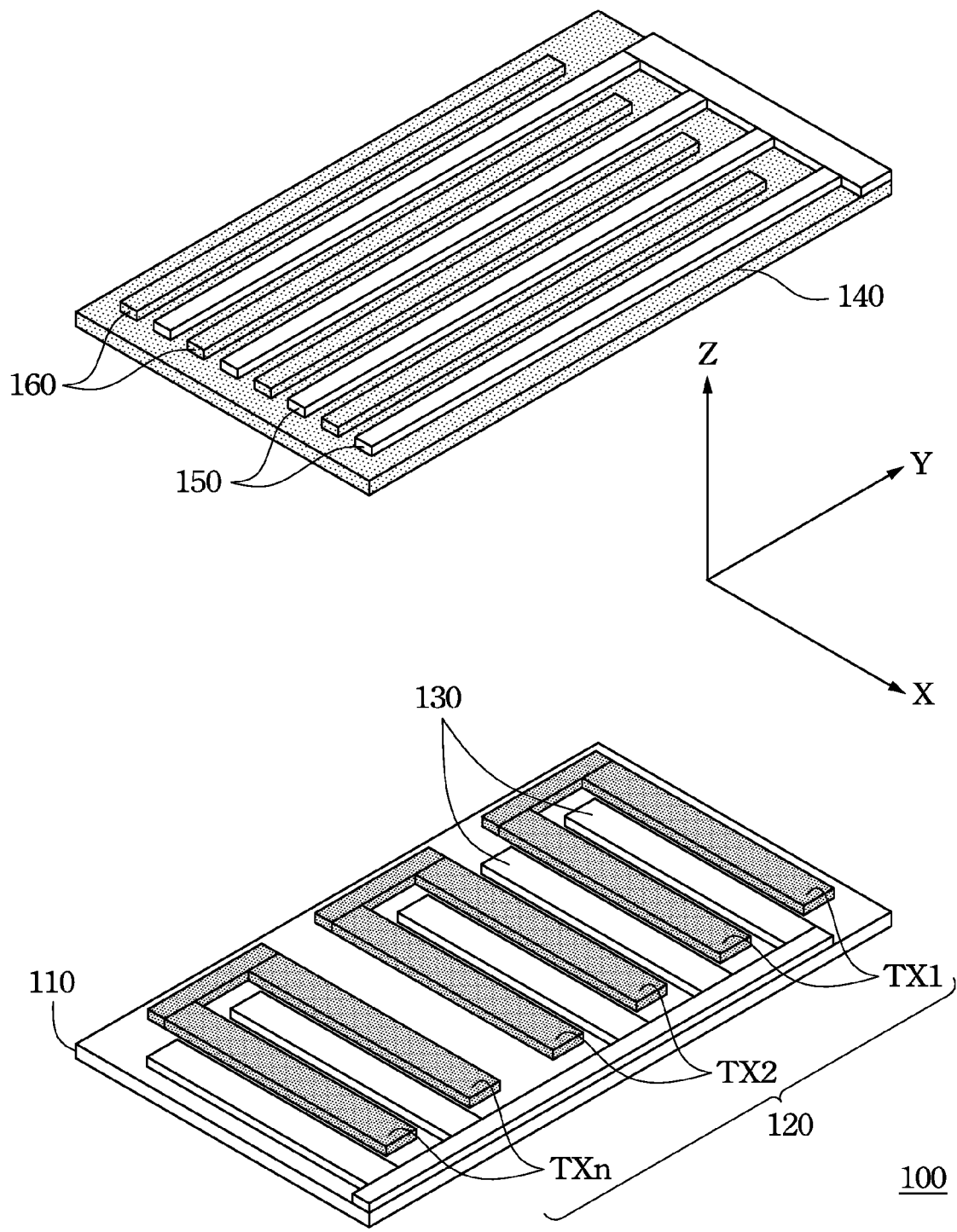
FIG. 1A schematically shows a diagram of a panel structure according to embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views.

Figure 1B:
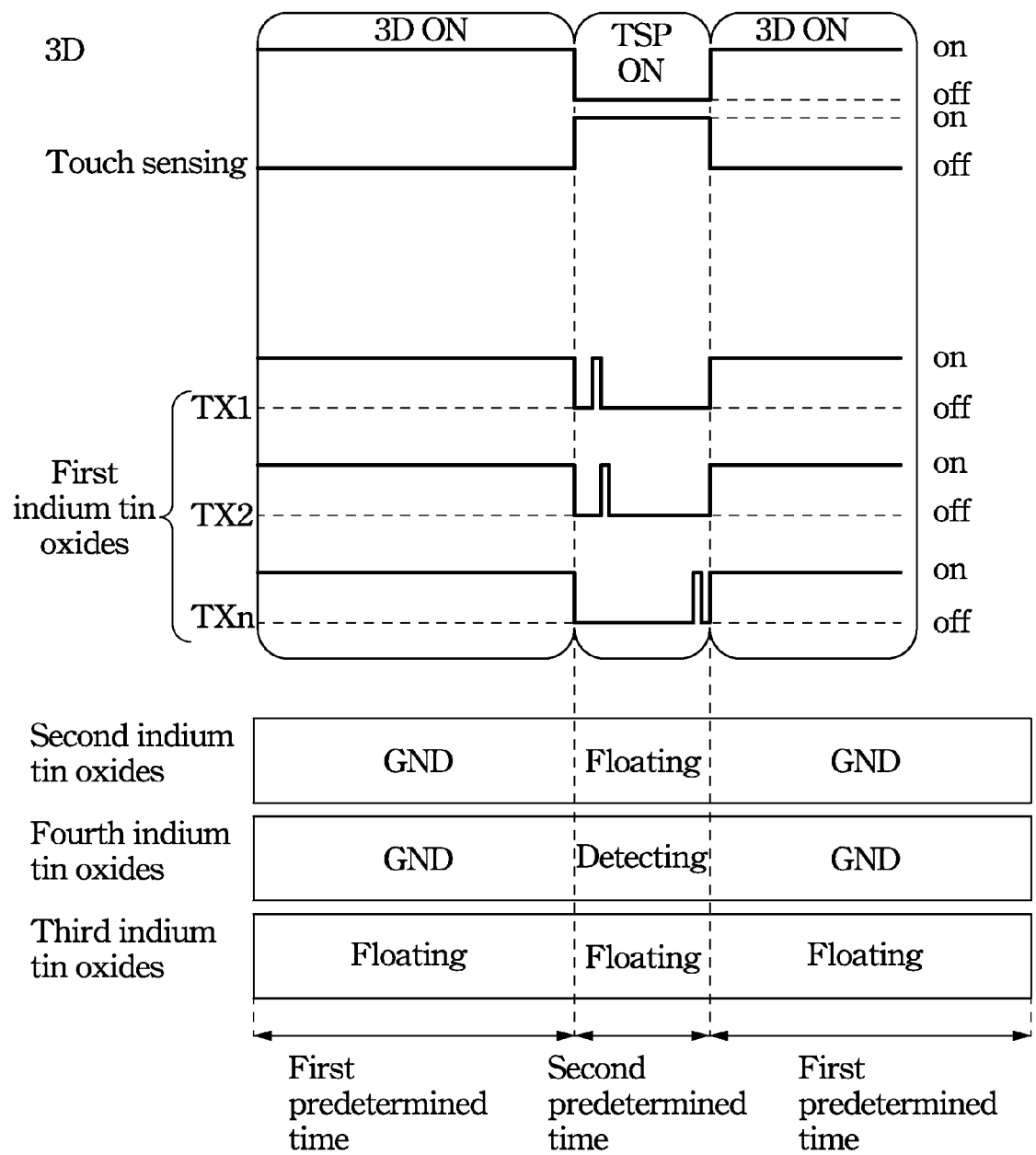
FIG. 1B schematically shows a control timing diagram of a panel structure according to FIG. 1A of the present invention.

FIG. 1A schematically shows a diagram of a panel structure 100 according to embodiments of the present invention. FIG. 1B schematically shows a control timing diagram of a panel structure 100 according to FIG. 1A of the present invention.

As shown in FIG. 1A, the panel structure 100 comprises a glass layer 110, a plurality of first indium tin oxide strips 120, a plurality of third indium tin oxide strips 130, a liquid crystal layer 140, a plurality of second indium tin oxide strips 150 and a plurality of fourth indium tin oxide strips 160.

With respect to the configuration of the panel structure 100, the first indium tin oxide strips 120 (TX1~TXn) and the third indium tin oxide strips 130 are all disposed on the glass layer 110, and each of the first indium tin oxide strips 120 and each of the third indium tin oxide strips 130 interlaced in a first direction (for example, X direction). The liquid crystal layer 140 is disposed on the first indium tin oxide strips 120 and the third indium tin oxide strips 130. The second indium tin oxide strips 150 and the fourth indium tin oxide strips 160 are all disposed on the liquid crystal layer 140, and each of the second indium tin oxide strips 150 and each of the fourth indium tin oxide strips 160 interlaced in a second direction (for example, Y direction). The first direction is substantially vertical to the second direction.

It is noted that the description of the first direction being substantially vertical to the second direction encompasses a configuration in which the first direction is almost vertical to the second direction. For instance, the angle between the first direction and the second direction may be about 80 degrees to about 100 degrees. As a result, the description of the first direction being substantially vertical to the second direction of the embodiment of the present invention is not intended to be limited to a configuration in which the first direction is exactly vertical to the second direction, and those skilled in the art can choose the first direction and the second direction according to actual requirements.

Reference is now made to FIG. 1B. With respect to the operation of the panel structure 100, the panel structure 100 operates in a first grating mode during a first predetermined time (the mode during 3D ON period as shown in FIG. 1B). The first indium tin oxide strips 120 (TX1~TXn) receive a voltage and the voltage level thereof is at a high voltage level, and the second indium tin oxide strips 150 and the fourth indium tin oxide strips 160 are grounded when the panel structure 100 operates in the first grating mode. Simultaneously, the first indium tin oxide strips 120 provide a voltage to the liquid crystal layer 140, and the liquid crystals of the liquid crystal layer 140 will be twisted in accordance with the voltage provided by the first indium tin oxide strips 120 such that light cannot pass through the liquid crystal layer 140 so as to form a barrier. The liquid crystal layer 140 operates in a 3D mode if the panel structure 100 of the embodiment of the present invention is integrated on the liquid crystal layer 140.

In addition, the panel structure 100 operates in a touch-sensing mode during a second predetermined time (the mode during TSP ON period as shown in FIG. 1B). The first indium tin oxide strips 120 (TX1~TXn) sequentially receive a driving voltage when the panel structure 100 operates in the touch-sensing mode. As can be seen in FIG. 1B, TX1 receives the driving voltage first, secondly TX2 receives the driving voltage, and so on. The fourth indium tin oxide strips 160 are operable to detect a touch event.

It is noted that the driving mode of the barrier of the first grating mode (3D mode) is that in which the first indium tin oxide strips 120 continuously receive a voltage and the voltage level thereof is at a high voltage level. The fourth indium tin oxide strips 160 of the touch-sensing mode are operable to detect a touch event during an unoccupied time of each line of the liquid crystal layer panel. Therefore, the driving mode of the first grating mode and that of the touch-sensing mode are different, and accordingly, the first grating mode and the touch-sensing mode of the panel structure 100 cannot be performed at the same time, and they should be performed alternately.

The first grating mode is correspondingly turned off when the panel structure 100 operates in the touch-sensing mode. In fact, the operating time of the touch-sensing mode is merely a few microseconds, and the turned-off time of the first grating mode is extremely short. For a user, the panel structure 100 appears to operate in the first grating mode all the time, and the user experience will not be negatively affected such that the first grating mode and the touch-sensing mode of the panel structure 100 can be operated nearly at the same time; in other words, a user can see the 3D image and the panel structure 100 can detect a touch event simultaneously.

In one embodiment of the present invention, the third indium tin oxide strips 130 are floating to prevent coupling capacitance when the panel structure 100 operates in the first grating mode. The second indium tin oxide strips 150 and the third indium tin oxide strips 130 are floating to prevent coupling capacitance when the panel structure 100 operates in the touch-sensing mode.

Referring to FIG. 1A, an insulation material is disposed between each of the first indium tin oxide strips 120 and the third indium tin oxide strips 130 adjacent thereto such that the first indium tin oxide strips 120 and the third indium tin oxide strips 130 will not be electrically connected together. Moreover, the insulation material is also disposed between each of the second indium tin oxide strips 150 and the fourth indium tin oxide strips 160 adjacent thereto such that the second indium tin oxide strips 150 and the fourth indium tin oxide strips 160 will not be electrically connected together. Through such use of the insulation material, the first indium tin oxide strips 120 and the fourth indium tin oxide strips 160 are prevented from making sensing mistakes when the panel structure 100 operates in the touch-sensing mode.

Figure 2A:
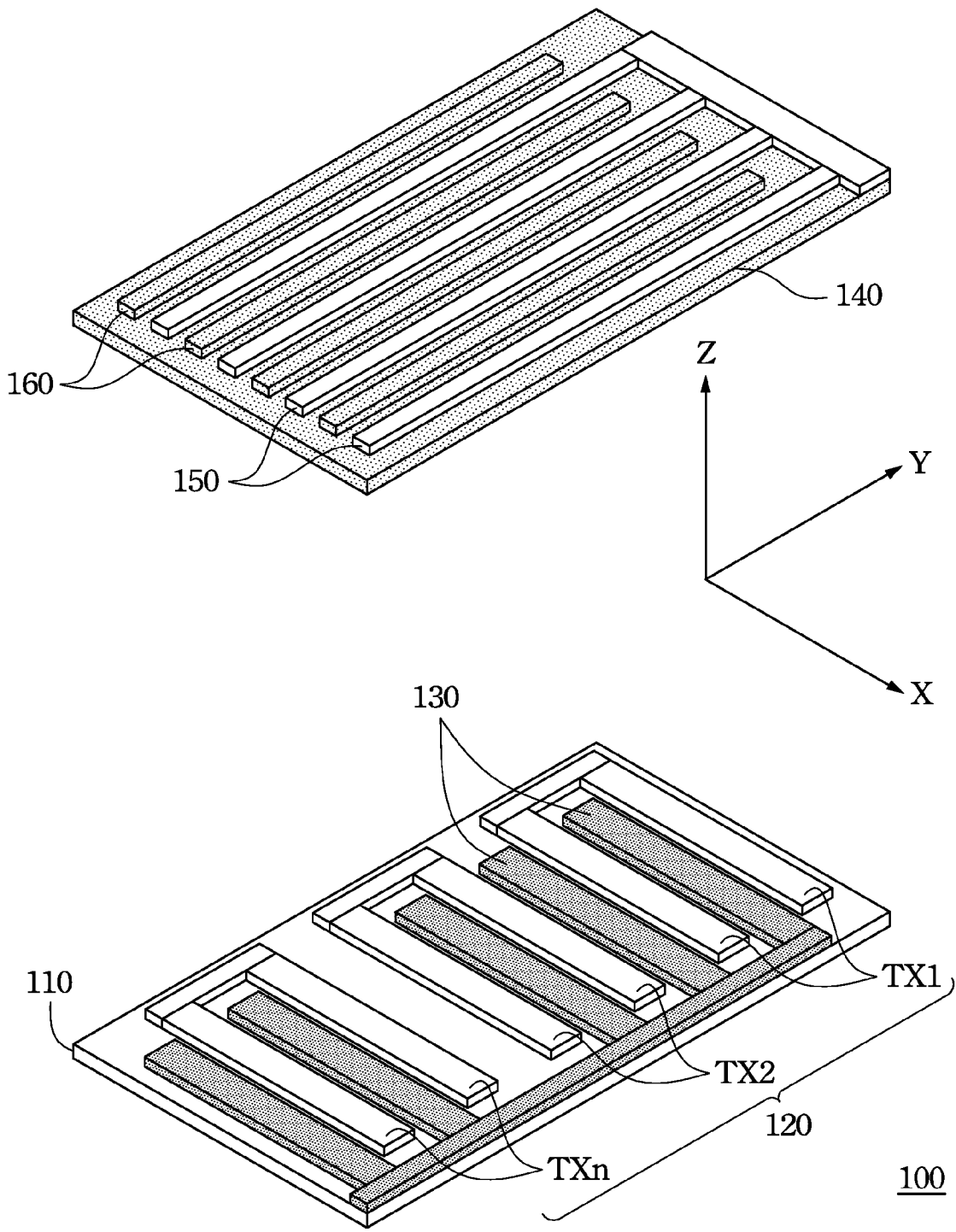
FIG. 2A schematically shows a diagram of a panel structure according to embodiments of the present invention.
Figure 2B:
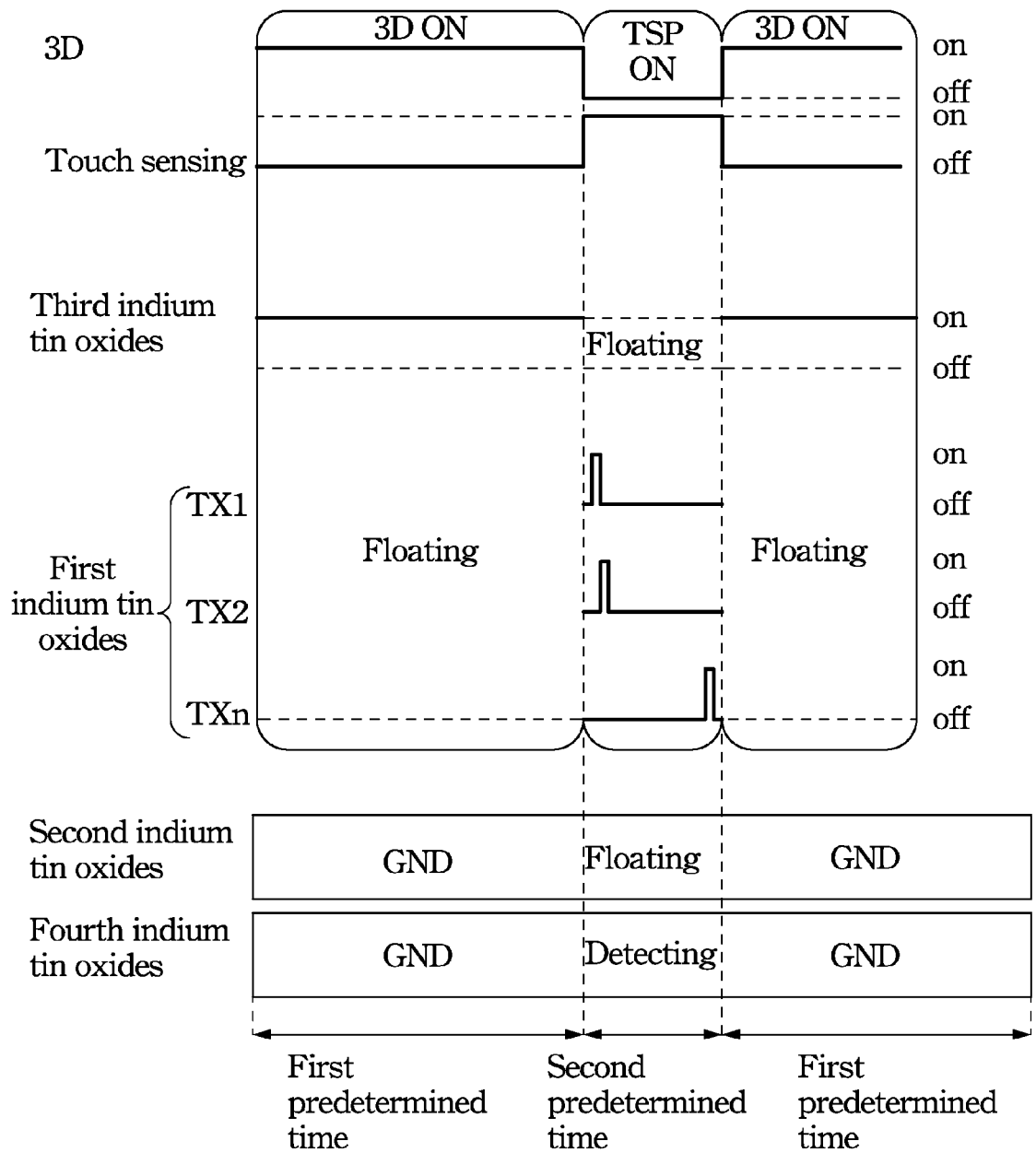
FIG. 2B schematically shows a control timing diagram of a panel structure according to FIG. 2A of the present invention.

FIG. 2A schematically shows a diagram of a panel structure 100 according to embodiments of the present invention. FIG. 2B schematically shows a control timing diagram of a panel structure 100 according to FIG. 2A of the present invention.

The configuration of the panel structure 100 in FIG. 2A is the same as the configuration thereof in FIG. 1A, but the operating mode of the two is different. Referring to both FIGS. 2A and 2B, the panel structure 100 operates in the second grating mode during the first predetermined time (the mode during 3D ON period as shown in FIG. 2B). The third indium tin oxide strips 130 receive a voltage and the voltage level thereof is at a high voltage level, and the second indium tin oxide strips 150 and the fourth indium tin oxide strips 160 are grounded when the panel structure 100 operates in the second grating mode. Simultaneously, the third indium tin oxide strips 130 provide a voltage to the liquid crystal layer 140, and the liquid crystals of the liquid crystal layer 140 will be twisted in accordance with the voltage provided by the third indium tin oxide strips 130 such that light cannot pass through the liquid crystal layer 140 so as to form a barrier. As shown in FIG. 2A, the barrier of the second grating mode is generated corresponding to the third indium tin oxide strips 130, and said barrier is different from the barrier as shown in FIG. 1A. The liquid crystal layer 140 operates in a 3D mode if the panel structure 100 of the embodiment of the present invention is integrated on the liquid crystal layer 140.

In addition, the panel structure 100 operates in a touch-sensing mode during a second predetermined time (the mode during TSP ON period as shown in FIG. 2B). The touch-sensing mode of the panel structure 100 herein is the same as the touch-sensing mode illustrated in FIG. 1B, and accordingly, a detailed description regarding the touch-sensing mode of the panel structure 100 is omitted. Furthermore, the first indium tin oxide strips 120 are floating to prevent coupling capacitance when the panel structure 100 operates in the second grating mode.

In one embodiment of the present invention, the panel structure 100 operates in a third grating mode in the first predetermined time. The second indium tin oxide strips 150 receive a voltage, and the first indium tin oxide strips 120 and the third indium tin oxide strips 130 are grounded when the panel structure 100 operates in the third grating mode. Simultaneously, the second indium tin oxide strips 150 provide a voltage to the liquid crystal layer 140, and the liquid crystals of the liquid crystal layer 140 will be twisted in accordance with the voltage provided by the second indium tin oxide strips 150 such that light cannot pass through the liquid crystal layer 140 so as to form a barrier. The fourth indium tin oxide strips 160 are floating when the panel structure 100 operates in a third grating mode to prevent coupling capacitance.

In another embodiment of the present invention, the panel structure 100 operates in a fourth grating mode during the first predetermined time. The fourth indium tin oxide strips 160 receive a voltage, and the first indium tin oxide strips 120 and the third indium tin oxide strips 130 are grounded when the panel structure 100 operates in the fourth grating mode. Simultaneously, the fourth indium tin oxide strips 160 provide a voltage to the liquid crystal layer 140, and the liquid crystals of the liquid crystal layer 140 will be twisted in accordance with the voltage provided by the fourth indium tin oxide strips 160 such that light cannot pass through the liquid crystal layer 140 so as to form a barrier. Moreover, the second indium tin oxide strips 150 are floating when the panel structure operates in the fourth grating mode to prevent coupling capacitance.

As a result, the panel structure 100 of the embodiment of the present invention can selectively choose to operate in the first, second, third, and fourth grating modes. The first grating mode and the second grating mode can be generalized into a group. If a user places the panel structure 100 in a lateral orientation, the panel structure 100 of the embodiment of the present invention can selectively operate in the first grating mode or the second grating mode according to actual requirements. Furthermore, the third grating mode and the fourth grating mode can be generalized into another group. If a user places the panel structure 100 in a longitudinal orientation, the panel structure 100 of the embodiment of the present invention can selectively operate in the third grating mode or the fourth grating mode according to actual requirements.

As a result, regardless of whether the panel structure 100 of the embodiment of the present invention is placed in lateral or longitudinal orientation, with the use of the above-mentioned operation, the panel structure 100 of the embodiment of the present invention can operate in a grating mode accurately and operate in both the grating mode and the touch-sensing mode without negatively affecting the user experience.

Figure 3:
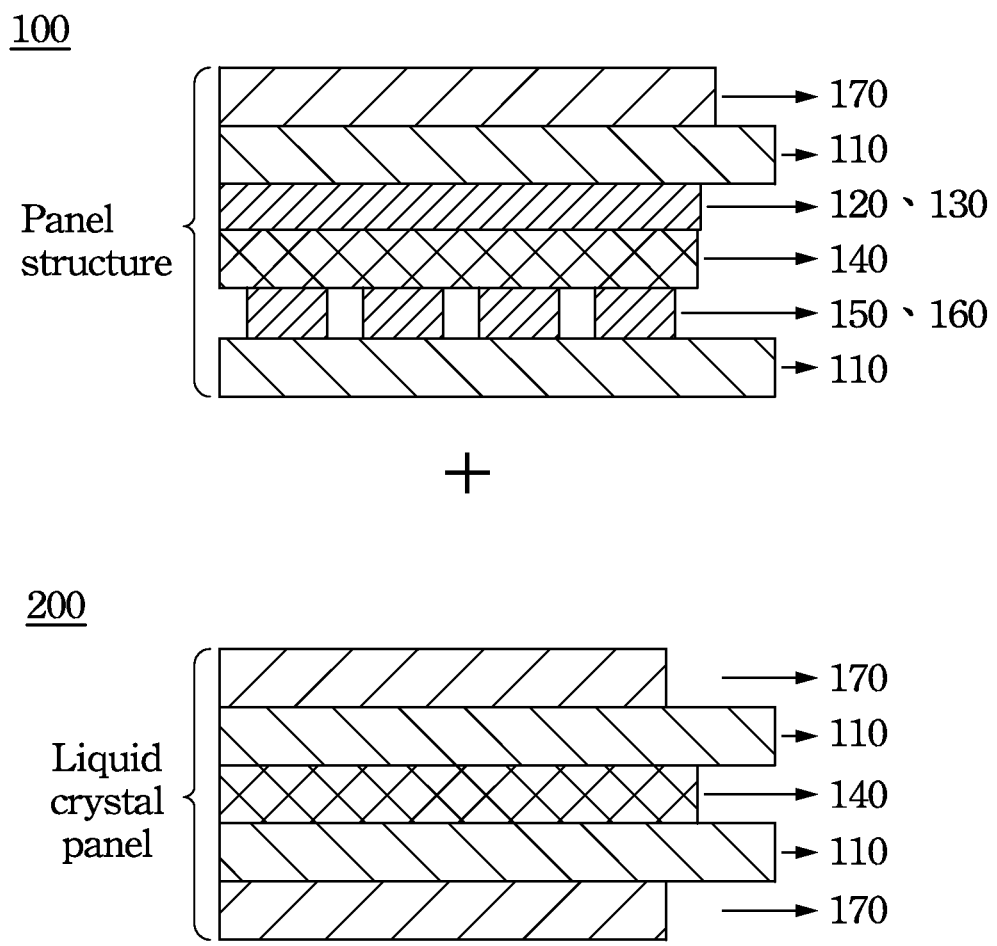
FIG. 3 schematically shows a diagram of a combination of a panel structure and a liquid crystal display according to embodiments of the present invention.

FIG. 3 schematically shows a diagram of a combination of a panel structure 100 and a liquid crystal display 200 according to embodiments of the present invention. As shown in FIG. 3, the panel structure 100 can further comprise a cover layer 170, and the liquid crystal panel 200 can comprise a glass layer 110, a liquid crystal layer 140, and the cover layer 170. The embodiment of the present invention combines touch-sensing technology and 3D displaying technology in the panel structure 100 as illustrated in FIG. 3. Specifically, the panel structures 100 as shown FIG. 1A and FIG. 2A are used to represent an implementation of the panel structure 100 as shown in FIG. 3. The embodiment of the present invention employs the configurations of FIGS. 1A and 2A to integrate lines that the touch-sensing signal needs in the barrier structure. For example, the first indium tin oxide strips 120 can be used as both signal lines of the touch-sensing technology and driving lines of the barrier structure, and the fourth indium tin oxide strips 160 can be used as both sensing lines of the touch-sensing technology and driving lines of the barrier structure. The panel structure 100 of the embodiment of the present invention employs the above-mentioned configuration to integrate touch-sensing technology and 3D displaying technology.

In the prior art, touch-sensing technology needs a touch-sensing structure and 3D display technology needs a barrier structure; therefore, if touch-sensing technology and 3D display technology need to be combined, a touch-sensing structure, a barrier structure and a liquid crystal panel must be integrated. Such integration involves a two-step lamination process. The first step involves adhering the touch-sensing structure on the barrier structure, and the second step involves adhering the structure formed in the first step on the liquid crystal panel. Compared with the prior art, the panel structure 100 of the embodiment of the present invention needs only one step to combine a touch-sensing structure, a barrier structure, and a liquid crystal panel so as to simplify the manufacture procedure, and reduce the use of glass substrates such that costs can be decreased and the thickness of the resulting device with touch-sensing technology and 3D displaying technology can be reduced.

In an optional embodiment of the present invention, the panel structure 100 further comprises a controller (not shown). The controller is operable to control the first indium tin oxide strips 120 to receive a voltage and control the second indium tin oxide strips 150 and the fourth indium tin oxide strips 160 to be grounded when the panel structure 100 operates in the first grating mode. The controller is operable to control the first indium tin oxide strips 120 to sequentially receive a driving voltage and control the fourth indium tin oxide strips 160 to detect a touch event when the panel structure 100 operates in the touch-sensing mode. The controller is operable to control the panel structure 100 to operate in the first grating mode and the touch-sensing mode alternately.

In view of the foregoing embodiments of the present invention, many advantages of the present invention are now apparent. The embodiment of the present invention provides a panel structure which needs only one step to combine a touch-sensing structure, a barrier structure, and a liquid crystal panel so as to simplify the manufacturing process, and reduce the use of glass substrates such that costs can be decreased and the thickness of the resulting device with touch-sensing technology and 3D displaying technology can be reduced.

In addition, the operating time of the touch-sensing mode of the panel structure is merely a few microseconds, and the turn-off time of the grating mode (3D) is extremely short. For a user, the panel structure appears to operate in the grating mode all the time, and the user experience will not be negatively affected such that the grating mode and the touch-sensing mode of the panel structure can be operated nearly at the same time; in other words, a user can see a 3D image and the panel structure can detect a touch event simultaneously.

Furthermore, regardless of whether the panel structure of the embodiment of the present invention is placed in a lateral or longitudinal orientation, with the use of the above-mentioned operation, the panel structure of the embodiment of the present invention can operate in a grating mode accurately and operate in both the grating mode and the touch-sensing mode without negatively affecting the user experience.

What is claimed is:

1. A panel structure, comprising:
a glass layer;
a plurality of first indium tin oxide (ITO) strips;
a plurality of third indium tin oxide strips, wherein the first indium tin oxide strips and the third indium tin oxide strips disposed on the glass layer, each of the first indium tin oxide strips and each of the third indium tin oxide strips interlaced in a first direction;
a liquid crystal layer disposed on the first indium tin oxide strips and the third indium tin oxide strips;
a plurality of second indium tin oxide strips; and
a plurality of fourth indium tin oxide strips, wherein the second indium tin oxide strips and the fourth indium tin oxide strips disposed on the liquid crystal layer, each of the second indium tin oxide strips and each of the fourth indium tin oxide strips interlaced in a second direction, wherein the first direction is substantially vertical to the second direction,
wherein the panel structure operates in a first grating mode during a first predetermined time, and the first indium tin oxide strips receive a voltage, and the second indium tin oxide strips and the fourth indium tin oxide strips grounded when the panel structure operates in the first grating mode,
wherein the panel structure operates in a touch-sensing mode during a second predetermined time, and the first indium tin oxide strips sequentially receive a driving voltage, and the fourth indium tin oxide strips are operable to detect a touch event when the panel structure operates in the touch-sensing mode, wherein the first grating mode and the touch-sensing mode of the panel structure are implemented alternately,
wherein the panel structure further comprises a controller, wherein the controller is operable to control the first indium tin oxide strips to receive the voltage and control the second indium tin oxide strips and the fourth indium tin oxide strips to be grounded when the panel structure operates in the first grating mode, and the controller is operable to control the first indium tin oxide strips to sequentially receive the driving voltage and control the fourth indium tin oxide strips to detect a touch event when the panel structure operates in the touch-sensing mode, and the controller is operable to control the panel structure to operate in the first grating mode and the touch-sensing mode alternately.

2. The panel structure according to claim 1, wherein the third indium tin oxide strips are floating when the panel structure operates in the first grating mode, and the second indium tin oxide strips and the third indium tin oxide strips are floating when the panel structure operates in the touch-sensing mode.

3. The panel structure according to claim 1, wherein an insulation material is disposed between each of the first indium tin oxide strips and the third indium tin oxide strips adjacent thereto, and the insulation material is also disposed between each of the second indium tin oxide strips and the fourth indium tin oxide strips adjacent thereto.

4. The panel structure according to claim 1, wherein the panel structure operates in the first grating mode or in a second grating mode during the first predetermined time, and the third indium tin oxide strips receive the voltage, and the second indium tin oxide strips and the fourth indium tin oxide strips are grounded when the panel structure operates in the second grating mode.

5. The panel structure according to claim 4, wherein the first indium tin oxide strips are floating when the panel structure operates in the second grating mode.

6. The panel structure according to claim 1, wherein the panel structure operates in the first grating mode or a third grating mode during the first predetermined time, and the second indium tin oxide strips receive the voltage, and the first indium tin oxide strips and the third indium tin oxide strips are grounded when the panel structure operates in the third grating mode.

7. The panel structure according to claim 6, wherein the fourth indium tin oxide strips are floating when the panel structure operates in the third grating mode.

8. The panel structure according to claim 1, wherein the panel structure operates in the first grating mode or a fourth grating mode during the first predetermined time, and the fourth indium tin oxide strips receive the voltage, and the first indium tin oxide strips and the third indium tin oxide strips are grounded when the panel structure operates in the fourth grating mode.

9. The panel structure according to claim 8, wherein the second indium tin oxide strips are floating when the panel structure operates in the fourth grating mode.

* * * * *